United States Patent [19]

Kobayashi et al.

[11] Patent Number: 5,426,337
[45] Date of Patent: Jun. 20, 1995

[54] SHEET METAL CASING FOR A SMALL ELECTRIC MOTOR

[75] Inventors: Kyoji Kobayashi; Atsushi Inagaki; Takanori Saito; Yoshimi Takano; Junichi Sato, all of Yokohama, Japan

[73] Assignee: Jidosha Denki Kogyo Kabushiki Kaisha, Yokohama, Japan

[21] Appl. No.: 753,241

[22] Filed: Aug. 30, 1991

[30] Foreign Application Priority Data

| Aug. 31, 1990 | [JP] | Japan | 2-232035 |
| Aug. 31, 1990 | [JP] | Japan | 2-232036 |
| Aug. 31, 1990 | [JP] | Japan | 2-232037 |
| Aug. 31, 1990 | [JP] | Japan | 2-232038 |

[51] Int. Cl.⁶ .................................. H02K 5/00
[52] U.S. Cl. ........................ 310/89; 310/42; 29/596
[58] Field of Search .......... 29/525, 596; 310/42, 310/83, 89

[56] References Cited

U.S. PATENT DOCUMENTS

| 2,544,266 | 3/1951 | Kennedy | 29/592.1 |
| 3,445,692 | 5/1969 | Kato | 310/42 |
| 4,309,815 | 1/1982 | Schmitt et al. | 310/89 |
| 4,885,948 | 12/1989 | Thrasher, Jr. et al. | 310/83 |
| 4,933,582 | 6/1990 | Hata et al. | 310/154 |
| 5,004,943 | 4/1991 | Gagneux | 310/42 |

FOREIGN PATENT DOCUMENTS

| 2411621 | 9/1975 | Germany | 310/89 |
| 1388076 | 3/1975 | United Kingdom | 310/89 |

Primary Examiner—Steven L. Stephan
Assistant Examiner—D. R. Haszko
Attorney, Agent, or Firm—Sughrue, Mion, Zinn, Macpeak & Seas

[57] ABSTRACT

A small-sized electric motor includes a yoke formed by bending a rectangular metallic plate into an oval shaped tube having a pair of flat parts and a pair of arcuate parts and joining opposite ends of the metallic plate. An end cap is secured on one end of the yoke and a gear casing is secured to the yoke by a tab formed on another end of the yoke. The joining faces of the metallic plate are located away from the center line of an arcuate part of the yoke and jagged faces are formed on the joining faces. The jagged faces are composed only of curved parts and straight parts having inclinations to the axis of the yoke. The end cap is secured by crimping a bendable tab formed on one end of the yoke by burring. A tab for securing the yoke to a gear box is formed by bending a tongue provided on the metallic plate together with notches on both sides of the tongue.

5 Claims, 10 Drawing Sheets

SHEET METAL CASING FOR A SMALL ELECTRIC MOTOR

BACKGROUND OF THE INVENTION

1. Field of the Invention

This invention relates to a small-sized electric motor used for actuating a seat, a steering wheel, or the like in automotive vehicles, for example, and more particularly, to a casing structure of the small-sized electric motor.

2. Description of the Prior Art

Figure 9A:
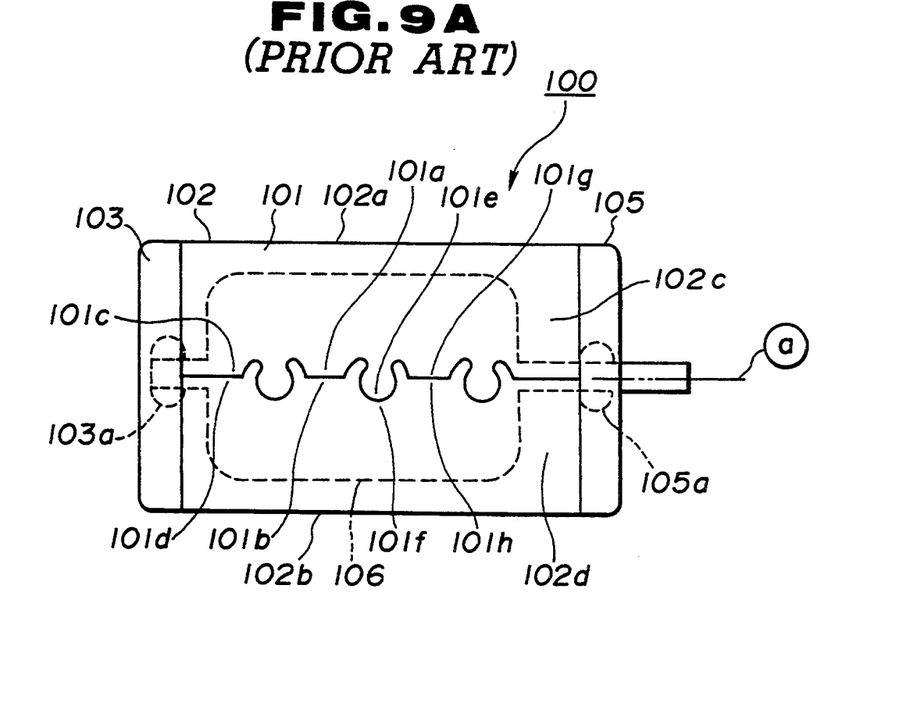
FIGS. 9A and 9B are a front view anti a partially sectional side view of the conventional small-sized electric motor.
Figure 9B:
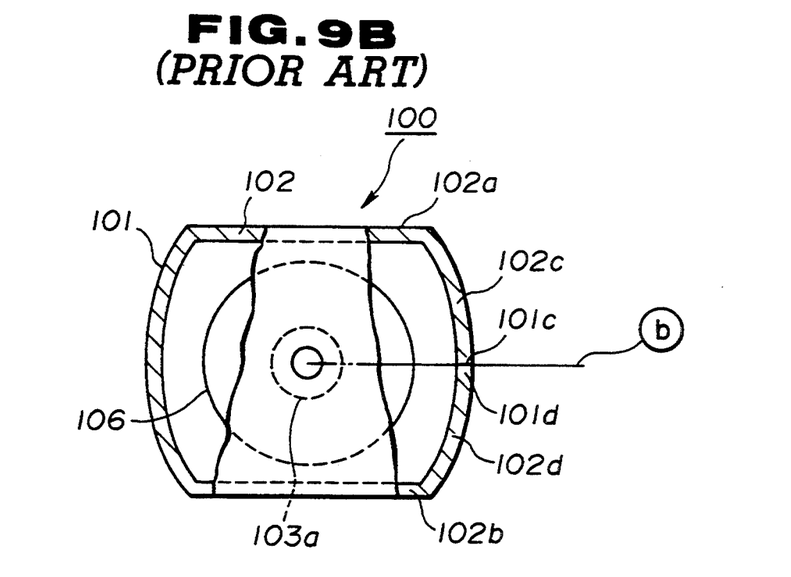
Figure 10:
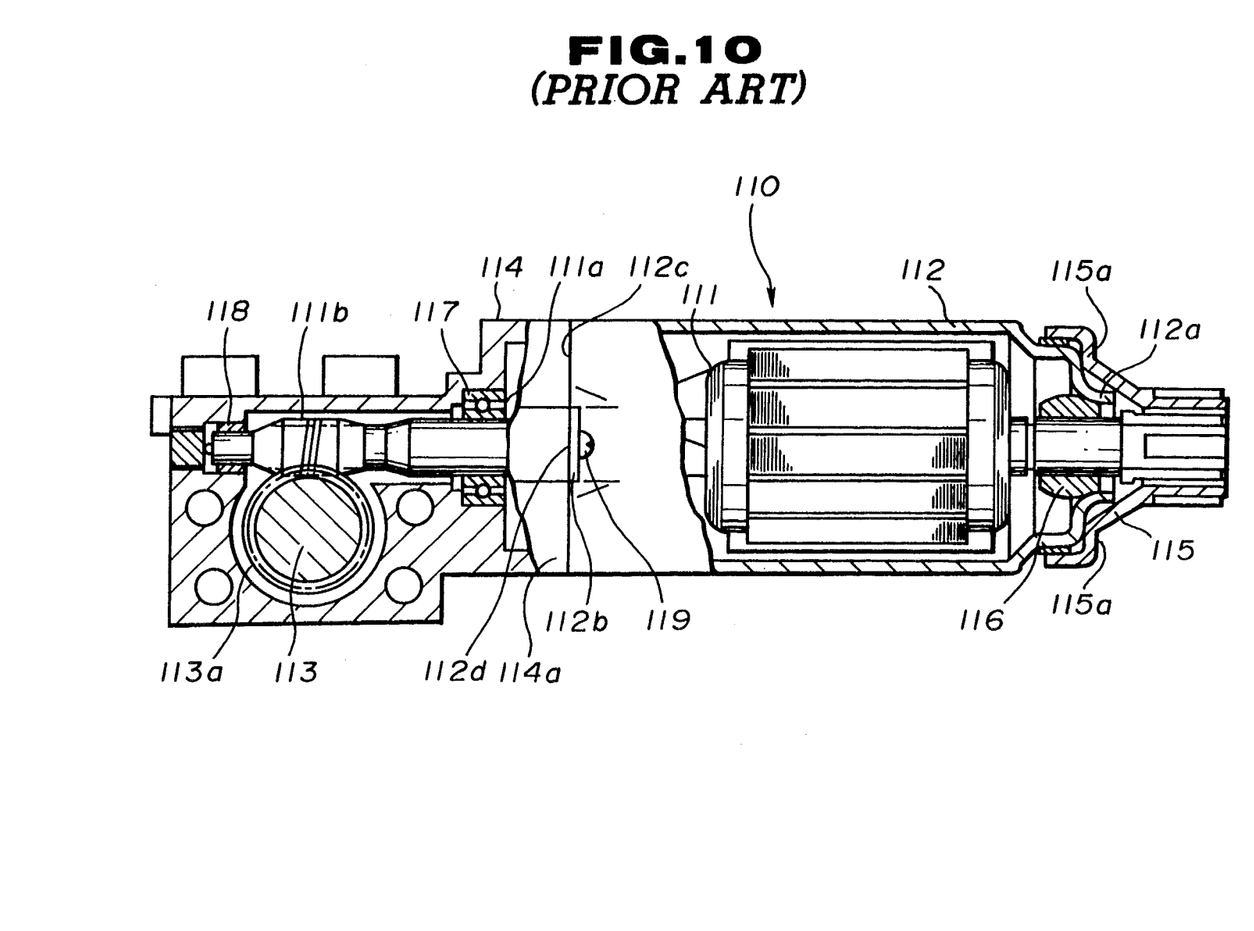
FIG. 10 is a longitudinal sectional view of another conventional small-sized electric motor.

Heretofore, there has been used small-sized electric motors as shown in FIGS. 9A, 9B and FIG. 10 for the aforementioned purpose.

A small-sized electric motor 100 shown in FIGS. 9A and 9B is provided with a yoke 102 formed with a hollow cylinder having an oval shaped cross section, an end cap 103 secured on the left-side end of the yoke 101 and a front cover 105 secured on the right-side end of the yoke 102 as shown in FIG. 9A. The end cap 103 and the front cover 105 are provided with bearings 103a and 105a, respectively. An armature 106 is housed in the yoke 102 and supported rotatably by the bearings 103a and 105a.

The yoke 102 is formed by rolling a rectangular shaped metallic plate 101 into an oval shape. The metallic plate 101 is provided with jagged faces 101c and 101d on both ends 101a and 101b thereof respectively, which are engaged with each other at the time of forming the metallic plate 101 into the oval shape, and the jagged faces 101c and 101d are composed of curved parts 101e, 101f and straight parts 101g, 101h which are parallel to the axis (a) of the yoke 102 and connect the curved parts 101e and 101f. The yoke 102 is formed so that the jagged faces 101c and 101d may be situated in the center (b) between an upper face 102a and a bottom part 102b of the yoke 102.

At the time of rolling the metallic plate 101 into the oval shape, the curved parts 101e and 101f are contacted closely by compressing the metallic plate 101 in the axial direction after engaging the curved (projecting) parts 101e on the jagged face 101c into the curved (concaved) parts 101f on the jagged face 101d and contacting the straight parts 101g and 101h with each other on the jagged faces 101c and 101d of the metallic plate 101.

However, in the small-sized electric motor 100 as mentioned above, a side plate 102c of the yoke 102 which is a part from the upper face 102a to the jagged face 101c of the metallic plate 101 and a side plate 102d of the yoke 102 which is a part from the bottom part 102b to the jagged face 101d of the metallic plate 101 sometimes vibrate sympathetically according to the rotation of the armature 106, and there is a problem since noise from the motor 100 becomes larger by the sympathetic vibration.

Additionally, there is another problem in that there is the possibility that the straight parts 101g and 101h are deformed to cause gaps therebetween because the yoke 102 of the motor 100 is formed by compressing the rolled metallic plate 101 in the axial direction at the state in which the curved parts 101e and 101f are engaged with each other and the straight parts 101g and 101h are in contact with each other as mentioned above, and the compressive force is applied in parallel to the straight parts 101g and 101h.

On the other hand, there has been also used a small-sized electric motor shown in FIG. 10.

A small-sized electric motor 110 shown in FIG. 10 is provided with an armature 111, a yoke 112 housing the armature 111, a gear casing 114 rotatably supporting an output shaft 113 and a conical shaped end cap 115 secured to the yoke 112 on the right side in the figure.

The yoke 112 is formed with a bearing fitting part 112a by two-step drawing on the right side thereof, an armature shaft 111a of the armature 111 is supported rotatably by a bearing 116 disposed on the bearing fitting part 112a and bearings 117, 118 disposed on the both sides of the gear casing 114 as shown in FIG. 10.

The end cap 115 is secured to the right side of the yoke 112 to cover the bearing fitting part 112a by spot welding at points 115a.

The yoke 112 is provided with a tab 112b formed by bending perpendicularly a tongue protruding from a contacting face 112c on the left side of the yoke 112, and the tab 112b is provided with a through hole for connecting the gear casing 114 therewith.

The gear casing 114 is housed with a worm 111b formed on the armature shaft 111a of the armature 111 and, a worm wheel 113a formed on the output shaft 113 and meshed with the worm 111b of the armature shaft 111a. The gear casing 114 is fixed on the left side of the yoke 112 at the contacting face 112c by tightening a screw 119 passing through the through hole of the tab 112b into a fitting part 114a of the gear casing 114.

However, in the small-sized electric motor 100 shown in FIG. 10, the bearing fitting part 112a is formed by two-step drawing as described above. There is the possibility that the wall thickness of the bearing fitting part 112a is not uniform because the bearing fitting part 112a is formed by the final step of the drawing. In such a case, the bearing 116 is easy to deviate from the center line of the motor 110, and there is a problem in that it is difficult to incorporate the armature 111 into the yoke 112 accurately and it is impossible to obtain desired rotational accuracy.

In addition to above, concerning the connection between the yoke 112 and the gear casing 114 through the tab 112b, the tab 112b is formed by bending the tongue provided on the side of the yoke 112 perpendicularly, therefore it is difficult to form the tab 112b so as to coincide the connective face 112d of the tab 112b with the contacting face 112c of the yoke 112. Accordingly, there is another problem since it is difficult to connect the gear casing 114 with the yoke 112 accurately and it is also impossible to obtain desired rotational accuracy in case there is a level gap between the connective face 112d of the tab 112b and the contacting face 112c of the yoke 112 in addition to a problem of the airtightness.

SUMMARY OF THE INVENTION

This invention is made to solve the aforementioned problems in the prior art. It is an object of the invention to provide a small-sized electric motor which is possible to prevent sympathetic vibrations and occurrence of gaps on the joining faces of the yoke, and possible to be manufactured with high accuracy and obtain the high rotational accuracy.

The construction of the small-sized electric motor according to this invention for attaining the aforementioned object is characterized by comprising a yoke formed by bending a rectangular metallic plate into an oval shaped tube having a pair of flat parts and a pair of arcuate parts, and joining respective opposite ends of the rectangular metallic plate, an armature housed in the yoke, an end cap secured on one end of the yoke for supporting the armature rotatably, and the yoke being formed so as to site the joining faces of the opposite ends of the rectangular metallic plate in a position on one of the arcuate parts at different distances from respective ends of the flat parts thereof.

In the preferred aspects of this invention, the rectangular metallic plate may be provided with jagged faces on the joining faces of the respective opposite ends thereof to be engaged with each other at the time of joining the respective ends thereof, and the jagged faces of the rectangular metallic plate may be only composed of curved parts or curved parts and straight parts connecting between the curved parts, and the straight parts have inclinations to an axis of the yoke.

In another preferred aspect of this invention, the yoke may be formed with a bendable tab by burring for securing the end cap on one end thereof.

In a further preferred aspect of this invention, the yoke is further secured with a gear casing containing reduction gears to reduce rotational speed of said armature through a tab formed on another end thereof, and the tab is formed by bending perpendicularly a tongue formed on the rectangular metallic plate together with notches at roots on both sides of the tongue.

Namely, in the small-sized electric motor according to this invention, since the yoke is formed by bending the metallic plate, the yoke does not vibrate so much as compared with the conventional yoke formed by drawing, and noise from the motor is reduced because the yoke is joined at a position away from the center line of the arcuate part thereof and the arcuate part is divided into parts having different dimentions and different resonance frequencies from each other.

In the small-sized electric motor according to one of preferred aspects of this invention, the rectangular metallic plate is provided with jagged faces on the joining faces of the respective opposed end thereof and the jagged faces are only composed of curved parts or curved parts and straight parts having directions differing from the axial direction of the yoke. Therefore, there is no straight part extending in the same direction as the compressive force on the jagged face of the metallic plate at the time of forming the yoke, so that the compressive force does not act so as to cause gaps between the jagged faces of the yoke.

In the small-sized electric motor according to another aspect of this invention, the end cap to support the armature rotatably is secured to the yoke by crimping a bendable tab formed on the one end of the yoke by burring. Accordingly, it is easy to center the armature in the yoke so as to obtain high rotational accuracy.

Additionally, in the small-sized electric motor according to another aspect of this invention, the tab of the yoke for fixing the gear casing is formed by bending the tongue which is provided on one side of the metallic plate to be formed into the yoke and having notches at roots on both sides thereof. Therefore, it is easy to form the tab by bending the tongue perpendicularly to the yoke so as not to cause a level gap between the connective face of the tab and the contacting face of the yoke since the notches are formed on both sides of the tongue. Accordingly, the gear casing is fixed to the yoke very easily with high accuracy.

DESCRIPTION OF THE PREFERRED EMBODIMENT

A small-sized electric motor according to an embodiment of this invention will be explained below on basis of FIG. 1 to FIG. 8.

Figure 1:
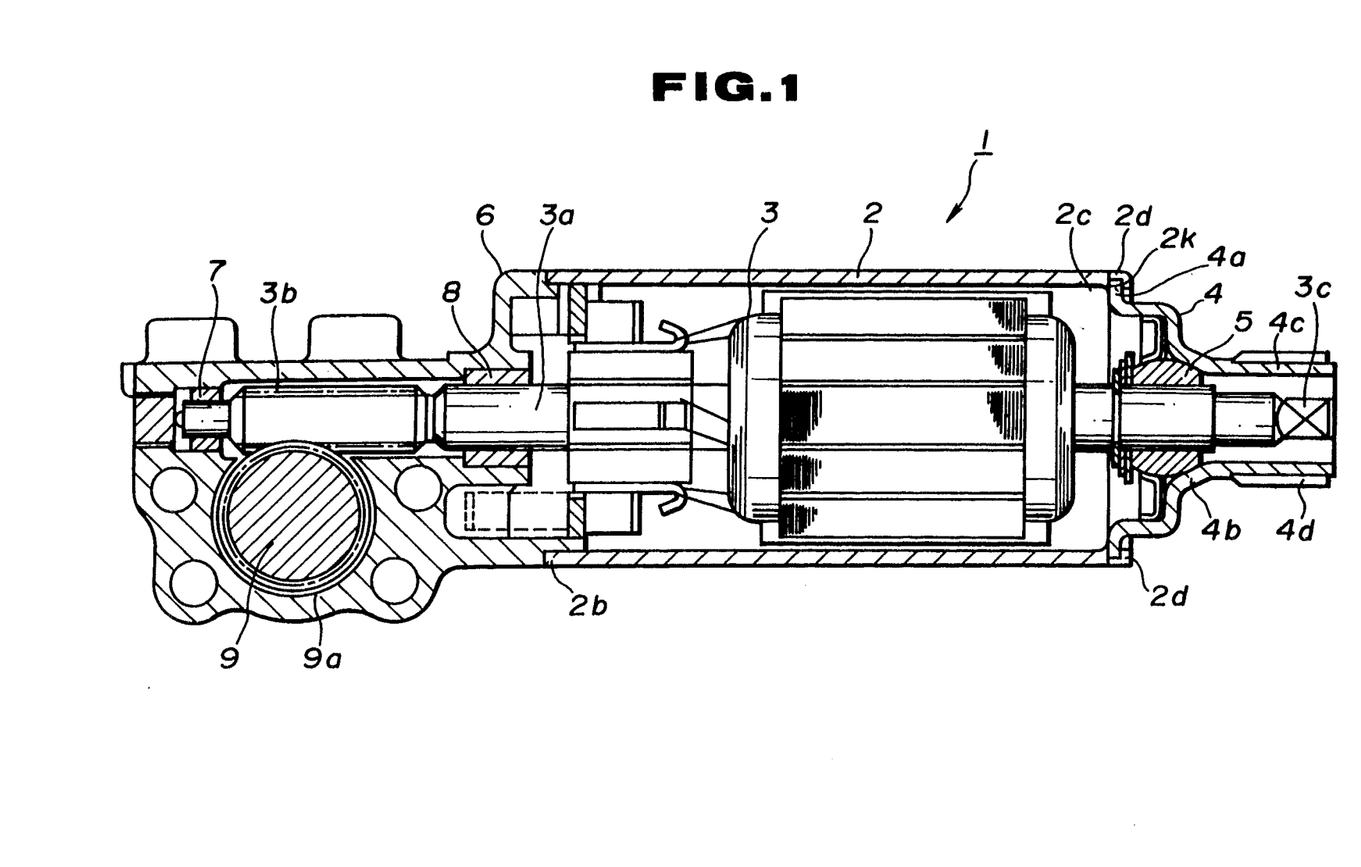
FIG. 1 is a longitudinal sectional view illustrating the small-sized electric motor according to an embodiment of this invention.

A small-sized electric motor 1 for an electric-driven seat mounted on an automotive vehicle shown in the figures comprises mainly a yoke 2, an armature 3 housed in the yoke 2, an end cap 4 disposed with a bearing 5 to support rotatably one end of an armature shaft 3a of the armature 3 and secured to the yoke 2 on the right side in FIG. 1, and a gear casing 6 disposed with bearings 7 and 8 to support rotatably the armature shaft 3a together with the bearing 5 and fixed to the yoke 2 on the left side in FIG. 1.

Figure 2:
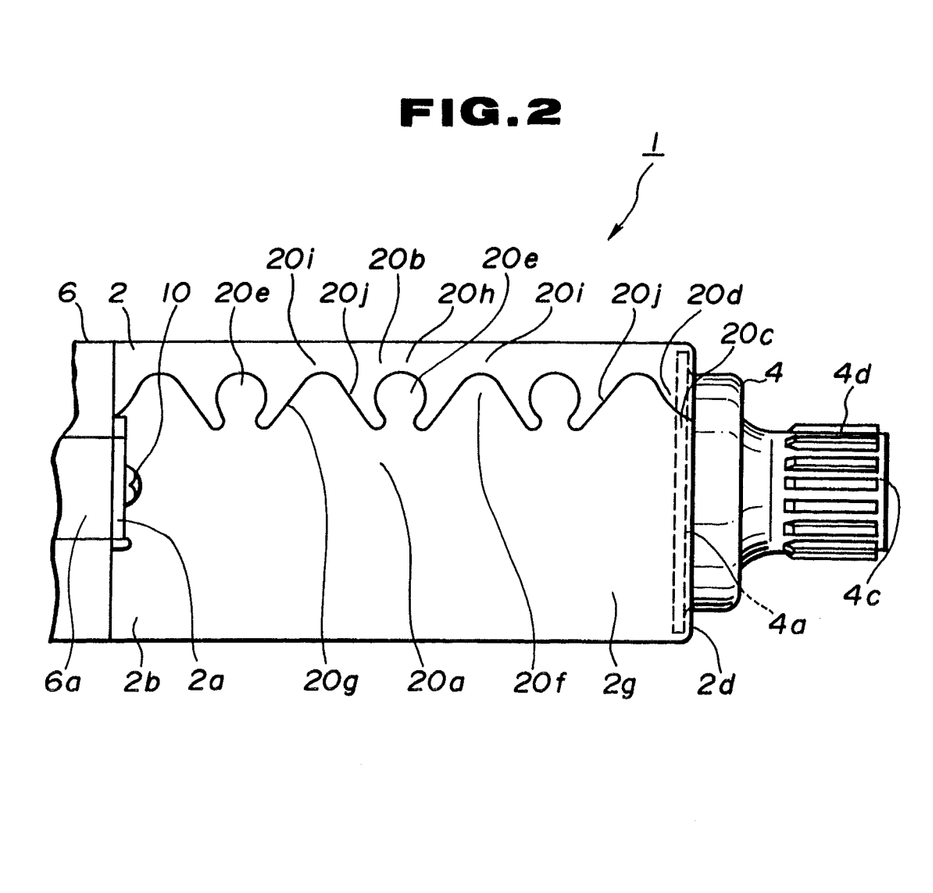
FIG. 2 is a fragmentary front view of the small-sized electric motor shown in FIG. 1.

The gear casing 6 is housed with an output shaft 9 provided with a worm wheel 9a meshed with a worm 3b formed on another end of the armature shaft 3a and fixed to the yoke 2 by tightening a screw 10 into a yoke connecting part 6a thereof though a tab 2a formed in the vicinity of a gear-side aperture 2b of the yoke 2 as also shown in FIG. 2.

The armature shaft 3a of the armature 3 is also provided with a cable connective part 3c to be connected with a seat driving cable (not shown) on the right end thereof as shown in FIG. 1. The seat driving cable and the aforementioned output shaft 9 are connected to a seat driving mechanism (not shown).

The end cap 4 is provided with an oval shaped flange 4a to be fitted into a cap-side aperture 2c of the yoke 2 on the right side in FIG. 1, and secured to the yoke 2 by crimping a bendable tab 2d formed by burring as described later. The end cap 4 is disposed with the bearing 5 at a bearing fitting part 4b formed by one-step drawing and provided with a cover part 4c for covering the cable connective part 3c of the armature shaft 3. The cover part 4c is formed with a spline 4d for holding the seat driving cable (not shown) on the outer periphery thereof.

Figure 3:
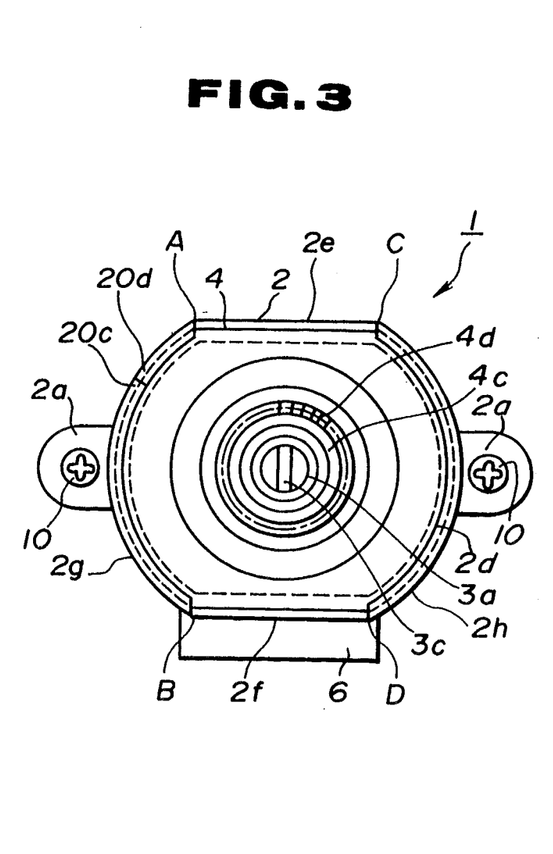
FIG. 3 is a right-side view of the small-sized electric motor shown in FIG. 1.
Figure 4:
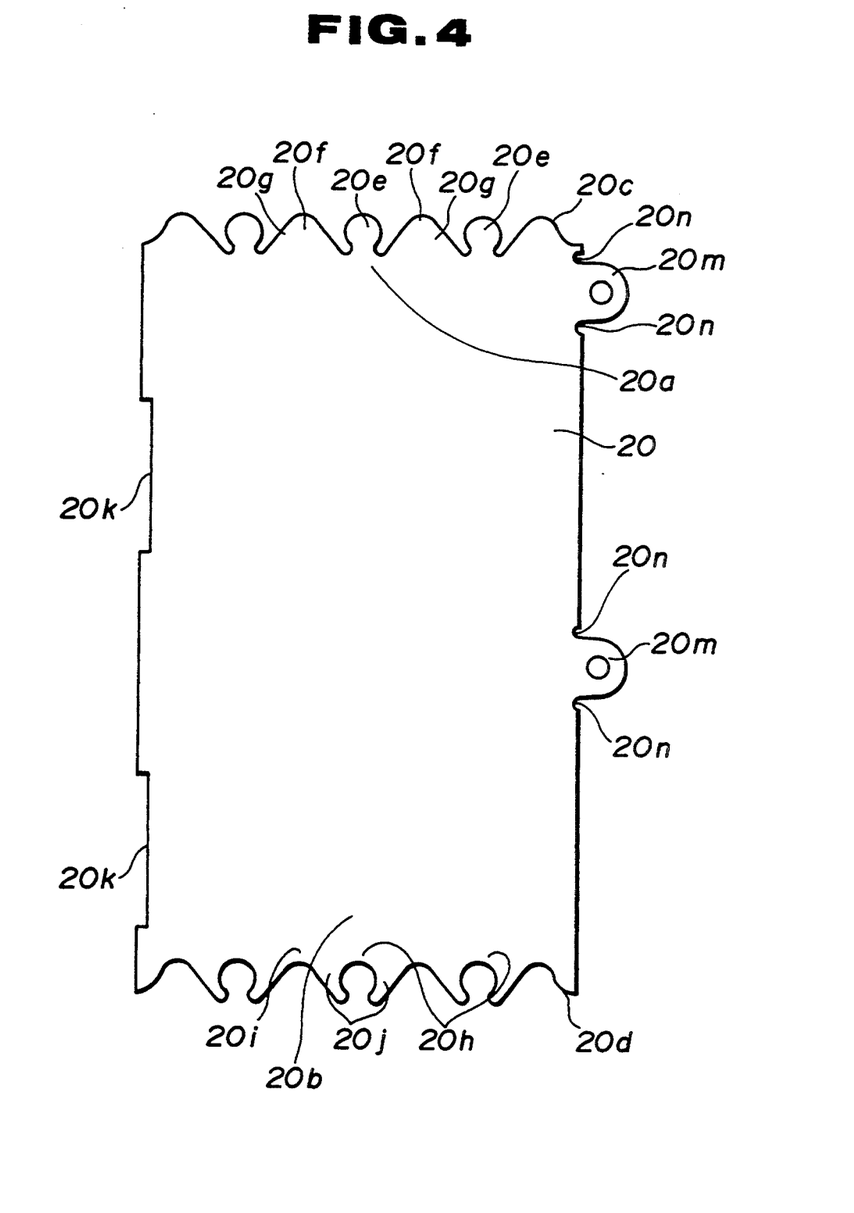
FIG. 4 is a plan view of the metallic plate for forming the yoke by rolling.
Figure 5A:
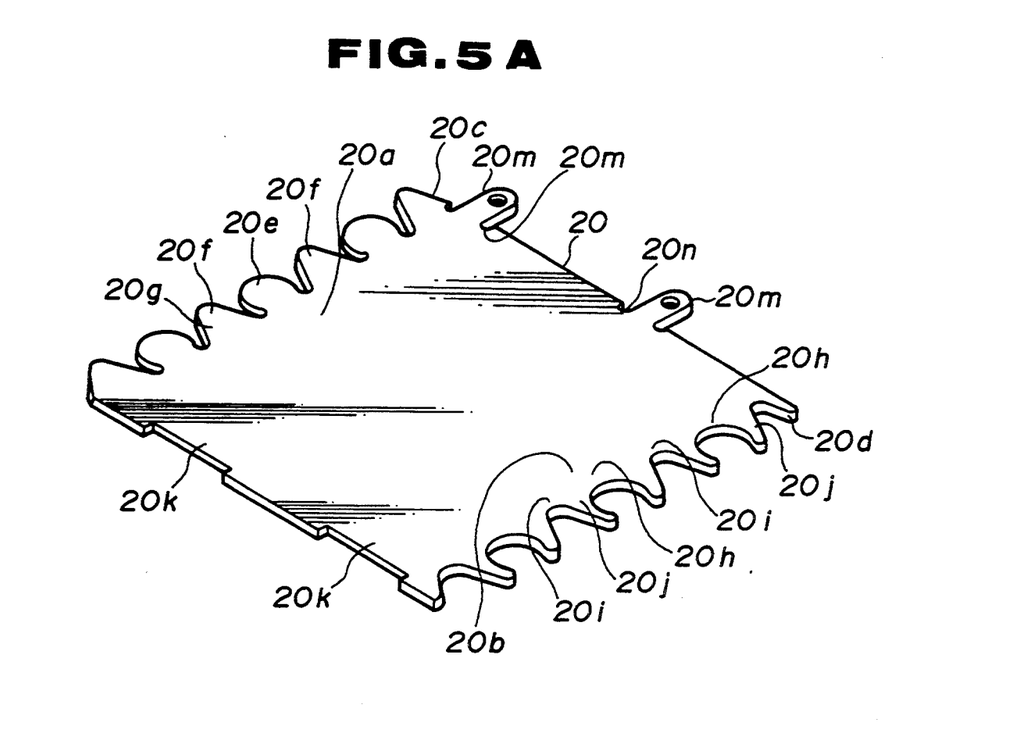
FIGS. 5A, 5B, 5C and 5D are perspective views illustrating forming process of the yoke of the small-sized electric motor shown in FIG. 1.

The yoke 2 is formed by bending a rectangular metallic plate 20 shown in FIG. 4 and FIG. 5A into an oval shaped tube having flat parts 2e, 2f and arcuate parts 2g, 2h as shown in FIG. 3. The metallic plate 20 is provided with jagged faces to be engaged with each other on joining faces 20c and 20d of respective opposite ends 20a and 20b to be joined at the time of bending the metallic plate 20. The yoke 2 is formed so that the joining faces 20c and 20d should be sited at a position which is not equidistant from an end A of the flat part 2e and an end B of the flat part 2f as shown in FIG. 3.

The metallic plate 20 is provided with the jagged face composed of a plurality of circular projections 20e (curved parts), a plurality of bow-like projections 20f (curved parts) and a plurality of straight parts 20g connecting between the curved parts 20e and 20f on the joining face 20c on the upper side in FIG. 4, and provided with the jagged face composed of a plurality of circular concavities 20h (curved parts), a plurality of bow-like concavities 20i (curved parts) and a plurality of straight parts 20j conecting between the curved parts 20h and 20i on the joining face 20d on the lower side in FIG. 4. The circular projections 20e and the bow-like projection 20f are so formed as to be engaged with the circular concavities 20h and the bow-like concavities 20i, respectively. Furthermore the straight parts 20g and 20j are designed so as to be fitted with each other, and also designed so as not to coincide with the direction of an axis of the yoke 2.

Additionally, the metallic plate 20 is provided with cutouts 20k on the left side in FIG. 4 and provided with two tongues 20m for bending perpendicularly so as to form the tab 2a and notches 20n at roots on both sides of the tongue 20m on the right side thereof as shown in FIG. 4.

Next, explanation will be given below about the forming process of the yoke 2 and the manufacturing process of the small-sized electric motor 1 on basis of FIG. 5 to FIG. 8.

Figure 5B:
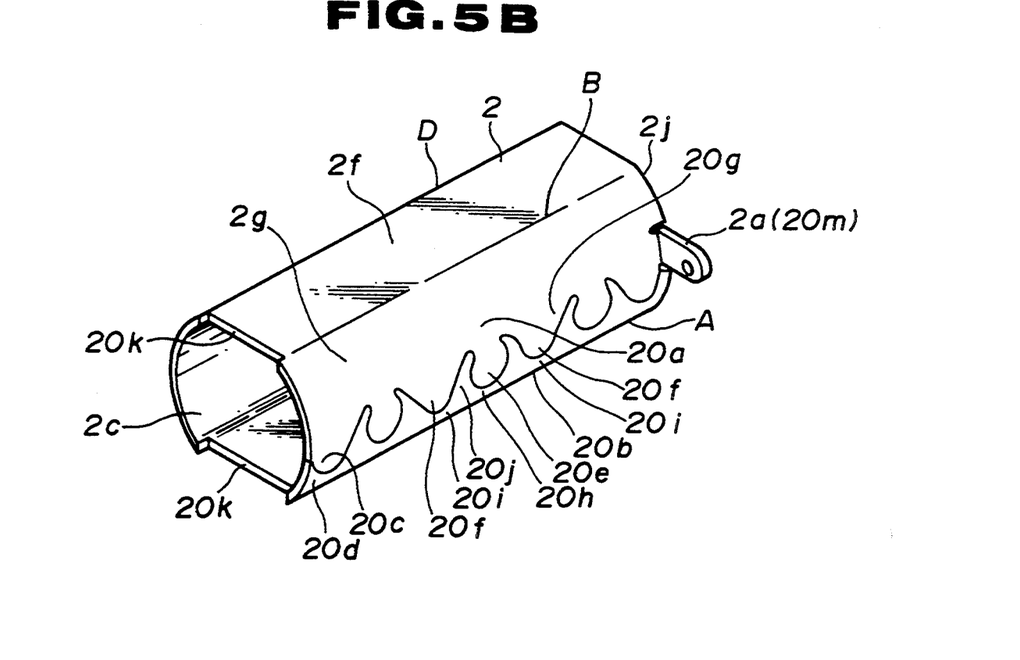

First of all, by engaging the cirular projections 20e and the bow-like projections 20f of the joining face 20c into the circular concavities 20h and the bow-like concavities 20i of the joining face 20d to join the opposite ends 20a and 20b of the metallic plate 20 having the structure as shown in FIG. 4 and FIG. 5A at the same time of bending the metallic plate 20 into an oval shape having the flat parts 2e, 2f and the arcuate parts 20g, 20h so as not to make the joining faces 20c and 20d coincide with the center line of the arc,.ate part 20g, the hollow cylindrical shaped yoke 2 is formed as shown in FIG. 5B. The tab 2a is formed by bending the tongue 20m of the metallic plate 20 outwardly in perpendicular.

Figure 6A:
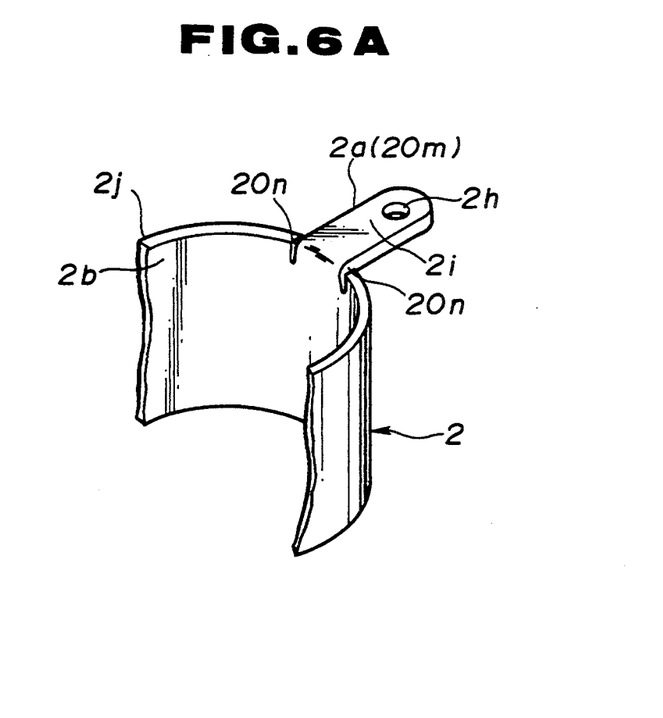
FIGS. 6A and 6B are a perspective view and a sectional view illustrating the tab for fixing the gear casing to the yoke in the small-sized electric motor shown in FIG. 1, respectively.
Figure 6B:
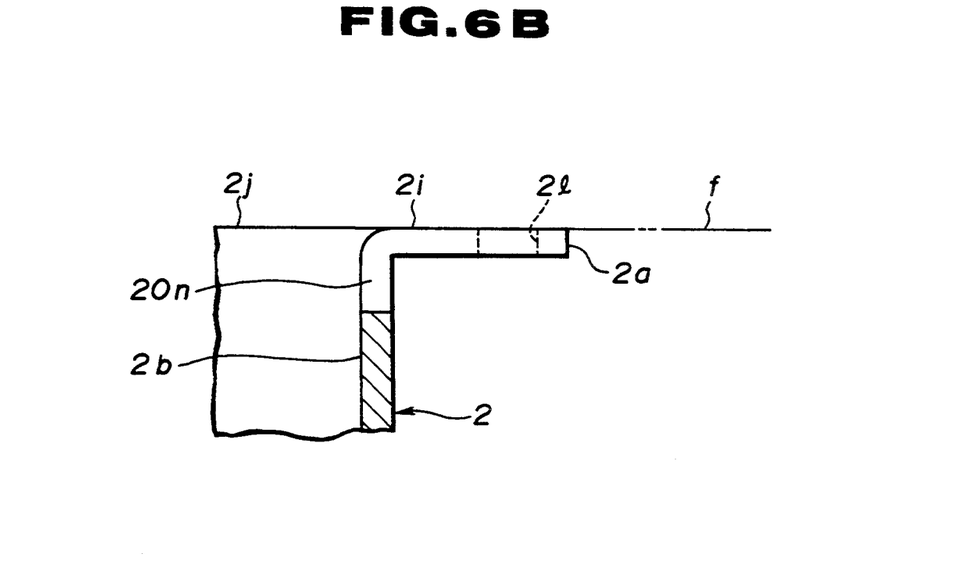

In this case, it is possible to bend the tongue 20m easily so as not to cause a level gap between a connective face 2i of the tab 2a to contact with the yoke connecting part 6a of the gear casing 6 and a contacting face 2j of the yoke 2 to contact with the gear casing 6 because the metallic plate 20 is provided with notches 20n on both sides of the tongue 20m as shown in FIGS. 6A and 6B. It is possible to reduce the noise from the motor 1 because the distance between the joining face 20d and another end C of the flat part 2e is not equal to the distance between the joining face 20c and another end D of the flat part 2f (see FIG. 3), and their resonance frequencies are different from each other.

Figure 5C:
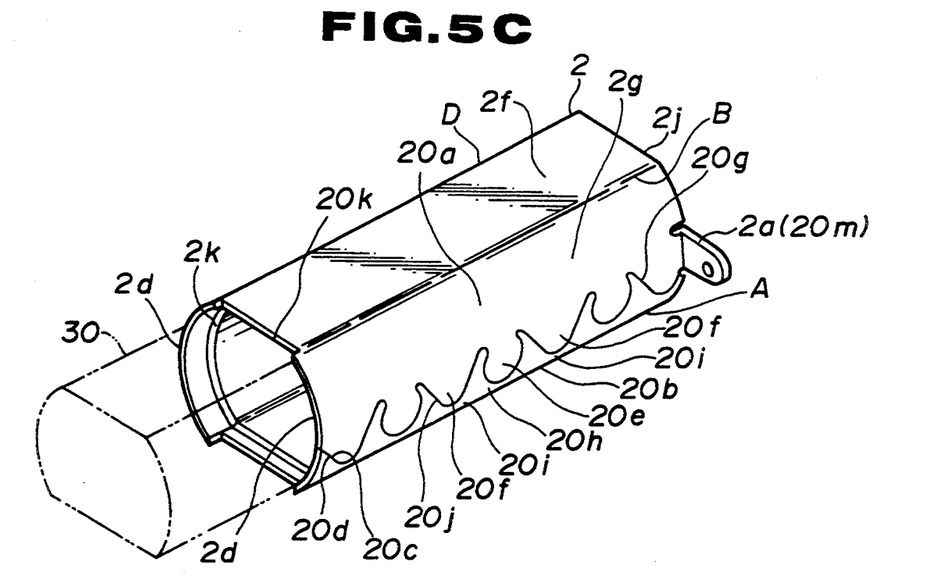
Figure 7A:
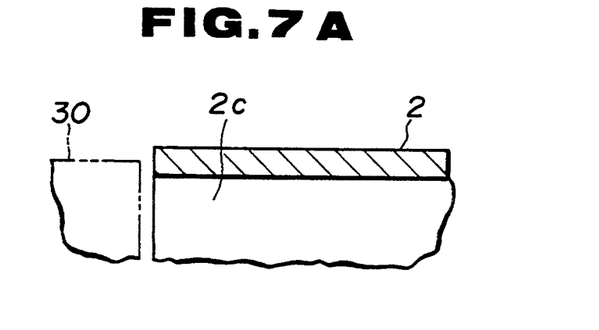
FIGS. 7A, 7B and 7C are partially enlarged sectional views illustrating burring process shown in FIG. 5C.
Figure 7B:
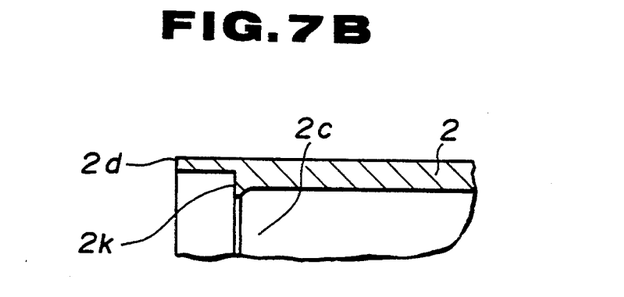

Next, burring is done as shown in FIG. 5C and FIGS. 7A and 7B using a burring punch 30 having a cross sectional shape slightly larger than a shape of the cap-side aperture 2c of the yoke 2. Namely, the yoke 2 is pressed with the burring punch 30 in the axial direction from the cap-side aperture 2c on the left side in FIG. 5C and FIGS. 7A and 7B, thereby forming the thin-walled bendable tab 2d to secure the end cap 4, and a contact face 2k to restrict the flange 4a of the end cap 4 so as not to move on the inner side of the cap-side aperture 2c of the yoke 2.

At the same time, the yoke 2 is compressed in the axial direction and the joining faces 20c and 20d are contacted closely with each other, so that the airtightness of the yoke is improved. In this case, a gap does not appear between the joining faces 20c and 20d because the directions of the compressive force and the straight parts 20j and 20g are not the same.

Figure 7C:
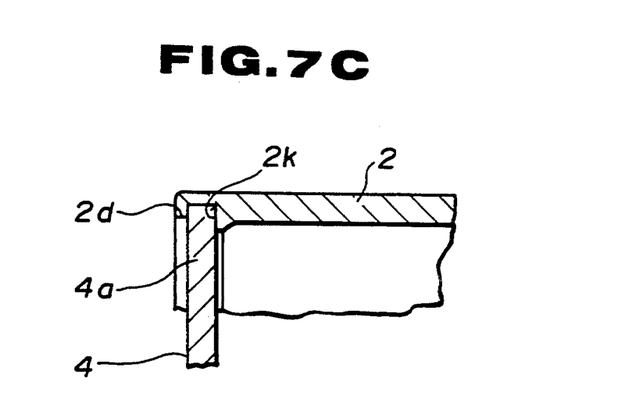
Figure 8:
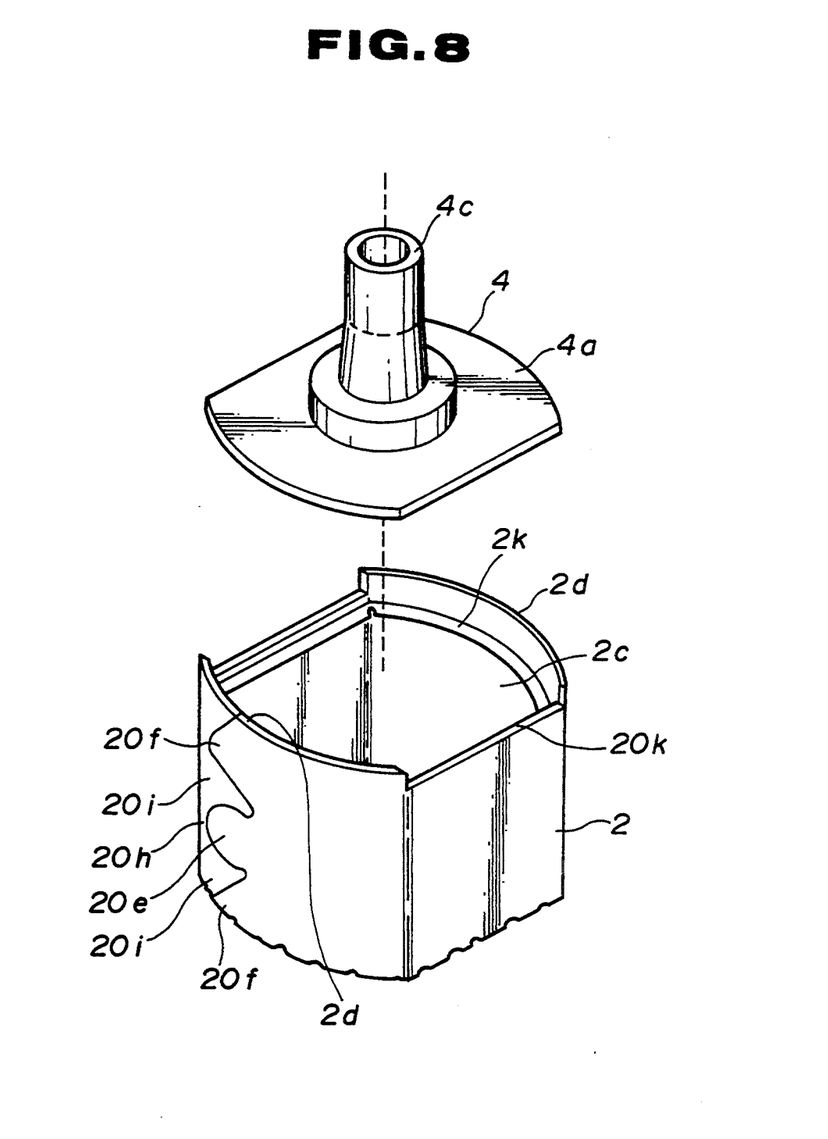
FIG. 8 is a perspective view illustrating a state of securing the end cap into the yoke in the small-sized electric motor shown in FIG. 1.

Then, the end cap 4 is fitted in to the cap-side aperture 2c of the yoke 2 as shown in FIG. 8 and the flange 4a of the end cap 4 is contacted with the contact face 2k formed on the inner periphery of the cap-side aperture 2c of the yoke 2 by burring. Whereby, the end cap 4 can be located very easily and is secured to the yoke 2 at the flange 4a by bending the bendable tab 2d inwards as shown in FIG. 5D and FIG. 7C.

Figure 5D:
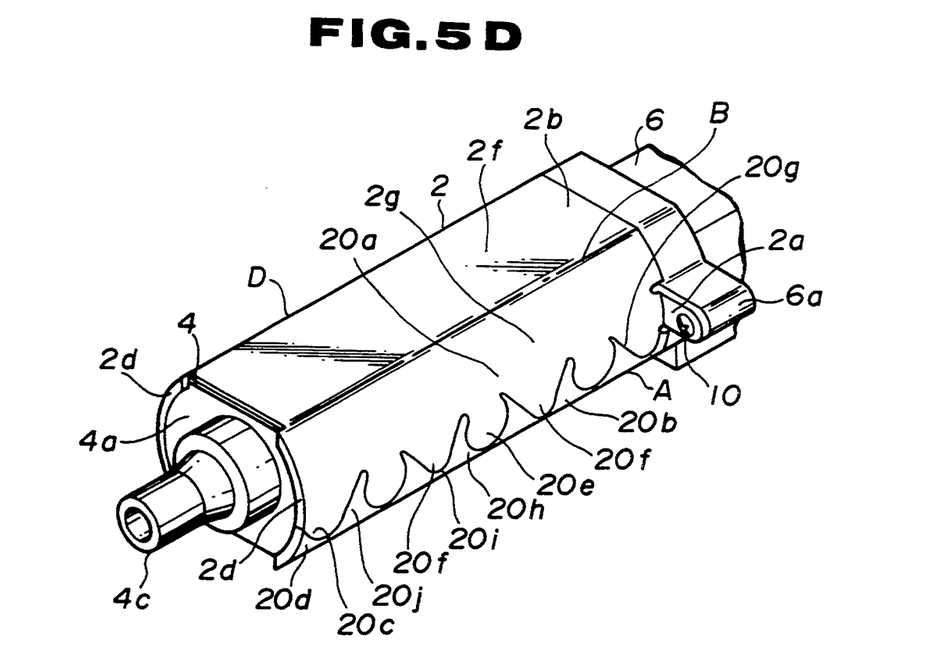

Finally, the gear casing 6 is fixed to the gear-side aperture 2b of the yoke on the right side in FIG. 5D by tightening the screw 10 passed through a through hole 21 of the tab 2a. In this case, a gap never appears between the yoke 2 and the gear casing 6 because the tab 2b is formed so that the contacting face 2j of the yoke 2 and the connective face 2i may be in one plane f as shown in FIG. 6B. Therefore, it is possible to improve the airtightness and the assembling accuracy.

As mentioned above, in the small-sized electric motor according to this invention having the above-mentioned structure, excellent effects can be obtained since it is possible to prevent sympathetic vibrations and occurrence of gaps between the joining faces of the yoke, and possible to improve the airtightness and the rotational accuracy of the motor.

What is claimed is:

1. A yoke for a small electric motor comprising:

an oval shaped tubular housing comprised of a rectangular metal sheet bent into said oval shape and having engaged edge portions, said oval shaped tubular housing having oppositely disposed first and second flat portions and first and second arcuate portions disposed between said first and second flat portions, said engaged edge portions being located in said first arcuate portion and having complementary first and second jagged faces engaged with each other with a first distance between the first jagged face of an engaged edge portion and the first flat portion being different from a second distance between the second jagged face of an engaged edge portion and the second flat portion, said oval shaped tubular housing having a bendable tab and a contact face portion on a first end portion thereof which are formed by burring the first end portion of said oval shaped tubular housing while securing the engaged edge portion together; and an end cap disposed in engagement with said contract face portion and secured to said oval shaped tubular housing by bending the bendable tab over said end cap.

2. A yoke for a small electric motor as set forth in claim 1, wherein said jagged faces of the engaged edge portions of the first arcuate portion are composed only of curved parts and straight parts connecting said curved parts with said straight parts being inclined to an axis of said yoke.

3. A yoke for a small electric motor as set forth in claim 1, further comprising a gear casing and connecting means for connecting said gear casing to said oval shaped tubular housing, said connecting means comprising a tab formed on a second end portion of said oval shaped tubular housing with said tab being formed by bending a tongue extending from said second end portion perpendicular to said housing wherein notches are provided in said second end portion adjacent opposite sides of said tongue to facilitate bending of said tongue.

4. A method for manufacturing a yoke of a small electric motor comprising:

forming an oval shaped tubular housing having a pair of oppositely disposed flat portions and a pair of arcuate portions disposed between said flat portions by bending a rectangular metal plate provided with jagged faces on oppositely disposed edge portions thereof to be engaged with each other and by engaging the jagged faces of the rectangular metallic plate with the engaged jagged faces being disposed in one of said arcuate portions;

burring an end portion of said oval shaped tubular housing in an axial direction thereof for forming a bendable tab and a contact face while simultaneously securing the engaged jagged faces of said oval shaped tubular housing to each other by axial compression;

locating an end cap with an oval shaped flange on said contact face provided on the end portion of said oval shaped tubular housing; and securing said end cap to said oval shaped tubular housing by bending said bendable tap provided on said end portion of said oval shaped tubular housing over said flange of said end cap.

5. A method for manufacturing a yoke of a small electric motor comprising:

forming a tubular housing by bending a rectangular metal plate provided with jagged faces on oppositely disposed edge portions thereof and by engaging the jagged faces with each other;

burring an end portion of said tubular housing in an axial direction thereof for forming a bendable tab and a contact face thereon while simultaneously securing the engaged jagged faces to each other by axial compression;

locating an end cap with a flange on said contact face; and securing said end cap to said tubular housing by bending said bendable tab over said flange.

* * * * *